Figure 1:
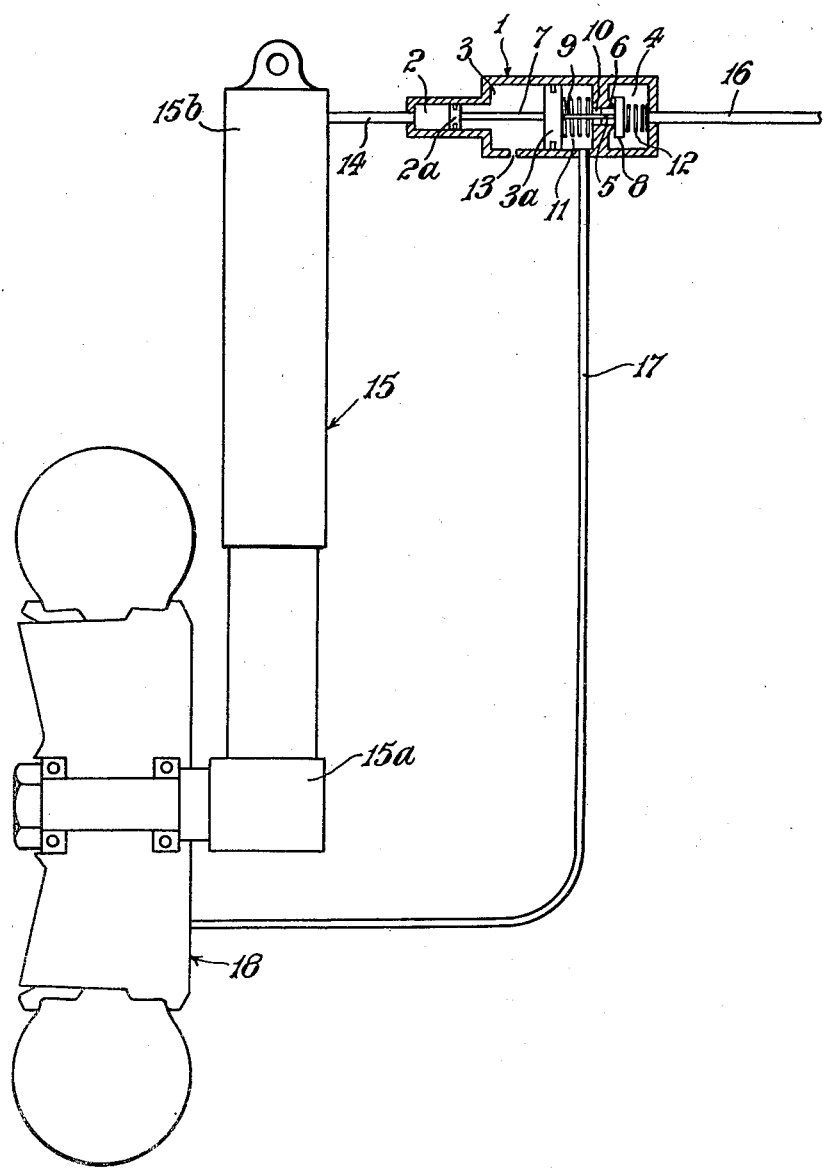

Nov. 6, 1951  H. W. TREVASKIS  2,574,426
BRAKING SYSTEM FOR AIRCRAFT
Filed July 13, 1949  4 Sheets-Sheet 1

INVENTOR
Henry William Trevaskis
by Benj. T. Rauber
his attorney

Nov. 6, 1951  H. W. TREVASKIS  2,574,426
BRAKING SYSTEM FOR AIRCRAFT
Filed July 13, 1949  4 Sheets-Sheet 4

INVENTOR
Henry William Trevaskis
by Benj. T. Rauber
his attorney

Patented Nov. 6, 1951

2,574,426

UNITED STATES PATENT OFFICE 2,574,426

BRAKING SYSTEM FOR AIRCRAFT

Henry William Trevaskis, Solihull, England, assignor to Dunlop Rubber Company Limited, London County, England, a British company Application July 13, 1949, Serial No. 104,560
In Great Britain July 16, 1948

1 Claim. (Cl. 244—111)

This invention relates to an improved automatic braking system for aircraft.

Aircraft wheel brakes, operated from a source of fluid pressure, are normally applied together through a valve or the like under the control of the pilot. The braking pressure employed is dependent entirely on the judgement of the pilot, who must ensure that this pressure is commensurate with the weight supported by the wheels at all stages of the landing operation, since, if the pressure employed is too little the brakes will have insufficient effect in stopping the aircraft, and if it is too great the wheels will lock. There is always a definite pressure that should not be exceeded when it is required to brake the aircraft in the shortest distance without damage to the tyres. This pressure is not constant, but is dependant upon a number of factors, the most important being the load on the aircraft wheels. The braking pressure required thus varies mainly with the weight of the aircraft on the ground, being greater as the weight increases.

Moreover, in an aircraft of the type in which a landing wheel is spaced on each side of the longitudinal axis of the aircraft, the weight supported by each wheel may not at all times be equal, due e. g. to a faulty landing, a cross-wind or unevenness in the landing surface. In such a case, if equal braking pressure is applied to both wheel brakes, it will cause the aircraft to deviate from its line of flight. Thus it will be seen that the amount of braking pressure applied to an individual wheel on braking should vary with the weight supported by that particular wheel.

It is known to provide an oleo strut between the fuselage and each wheel of the aircraft to act as a shock absorber for the very considerable shocks experienced when landing. Such oleo struts basically consist of a cylinder filled with oil and air under pressure and a piston slidably fitted therein. The upper end of the oleo strut is attached to the under part of the aircraft fuselage and the lower part is attached to the wheel asesmbly. The landing shocks are taken up by the inwardly moving piston compressing the air within the cylinder of the strut, a damping effect being obtained by the oil.

It is the object of the present invention to provide an improved braking system for aircraft in which the braking pressure applied to each wheel on landing is automatically controlled by the load on the wheel.

According to the invention a braking system for aircraft wherein the wheels are mounted on oleo-struts, comprises a pressure chamber connected to a source of fluid pressure, an operating chamber communicating with said pressure chamber and connected to a fluid-pressure operated brake mechanism associated with a wheel, an inlet valve controlling the flow of fluid from the pressure chamber to the operating chamber, means actuated by contraction of the strut associated with said wheel for opening said valve and means actuated by the pressure in the operating chamber for closing said valve, whereby the braking pressure is varied in accordance with the load on the wheel.

Figure 2:
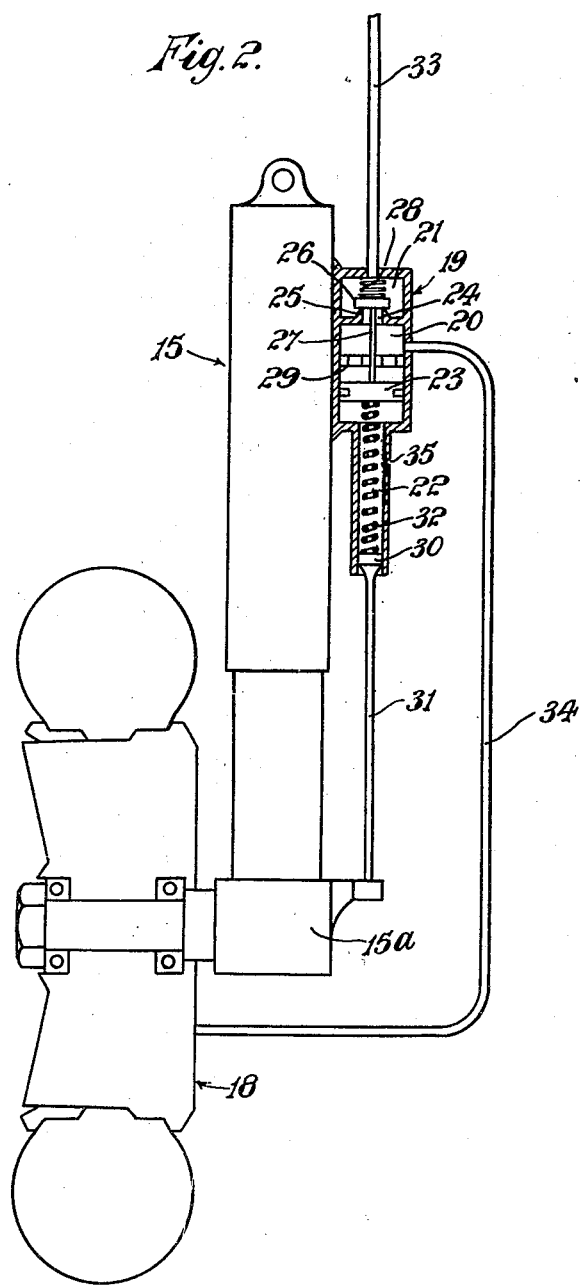
Figure 3:
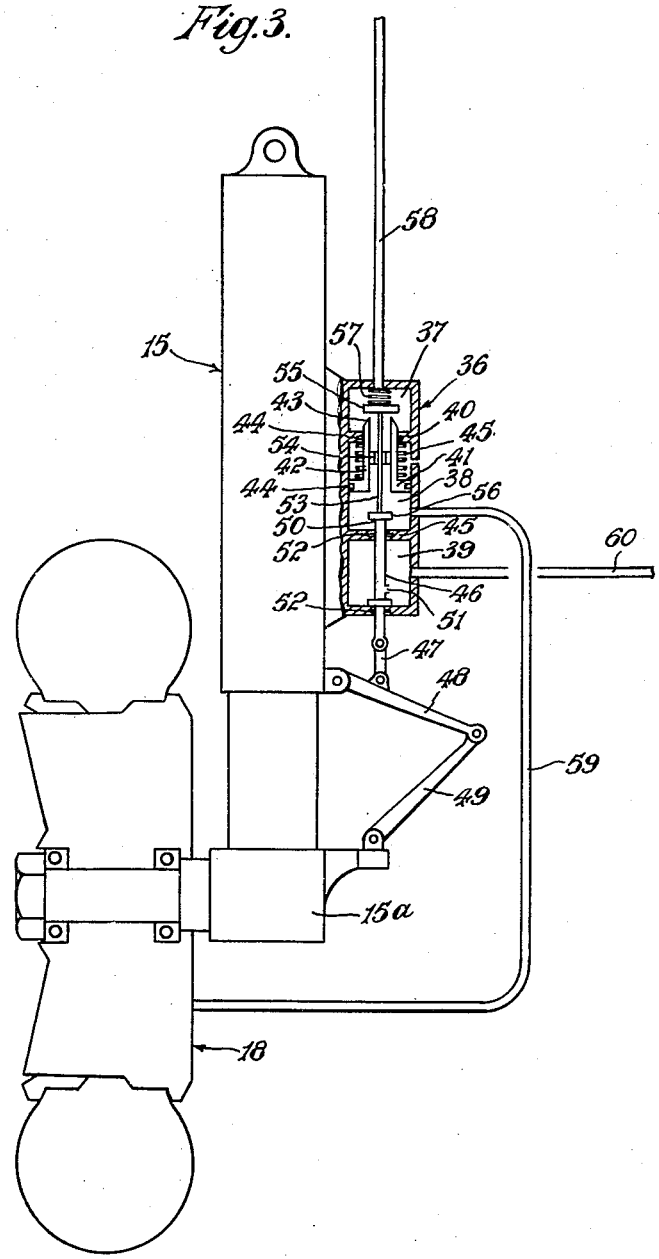
Figure 4:
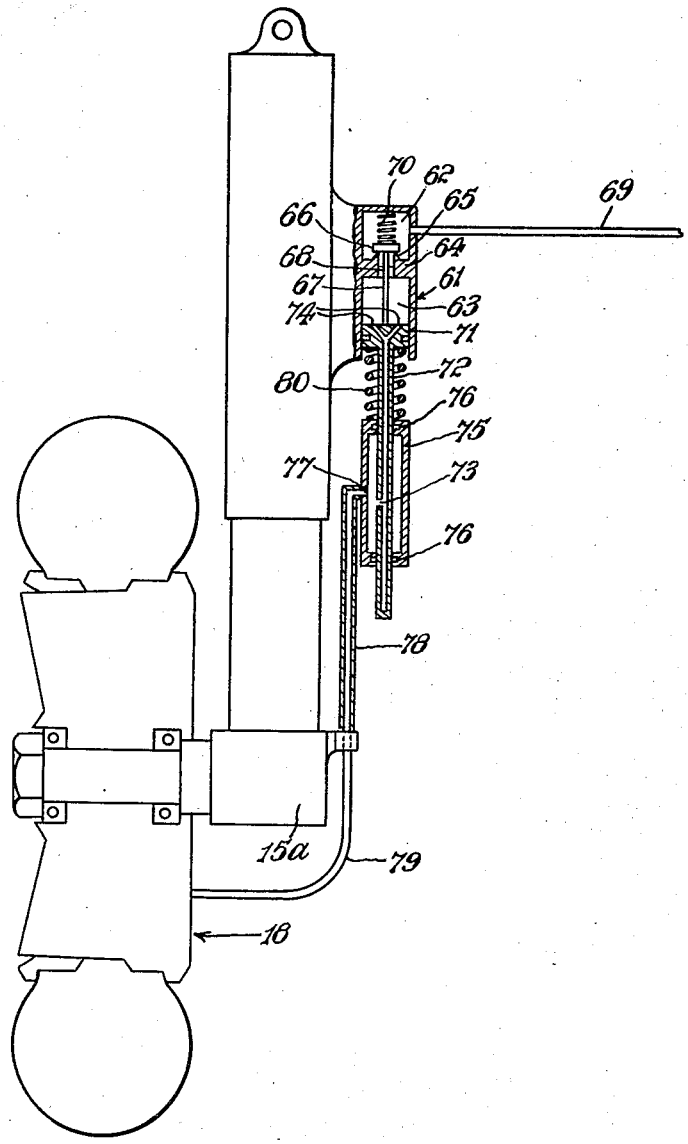

Four embodiments of the invention are shown in the accompanying drawings which illustrate diagrammatically an oleo strut adapted to be secured at one end, hereinafter referred to as the top, to an aircraft fuselage, and secured at the other end, hereinafter referred to as the bottom, to an axle. Rotatably secured to the axle is a wheel assembly comprising a fluid-operated brake mechanism of known type, and a load-supporting tyre is mounted on the rim of the wheel. The fluid-pressure control devices illustrated in Figures 1, 2 and 4 are shown in the position corresponding to that in which the associated oleo-strut is fully extended, i. e. before touching down, whilst in Figure 3 the device is shown in a position corresponding to that in which the oleo-strut is partially deflected i. e. on touching down. The devices are shown diagrammatically in section, and will now be more specifically described.

In the first embodiment of the invention (Figure 1) the system comprises a housing I containing two intercommunicating and coaxial cylinders 2 and 3 of unequal diameter and adjacent one another and an outer chamber 4 adjacent to and coaxial with the larger cylinder. An aperture 5 is provided centrally in the wall between the larger cylinder 3 and the outer chamber 4, having a valve seat 6 extending into the outer chamber. A piston 2a is slidably fitted in the smaller cylinder and a piston 3a is slidably fitted in the larger cylinder and said two pistons are connected together by a rod 7. A valve 8 is provided in the outer chamber adapted to operate over the valve seat 6 and having a valve stem 9 which extends axially into the larger cylinder and has a length such that it will contact the larger piston at certain positions of said piston's stroke. The valve stem is maintained co-axially in said cylinder by a sleeve 10 fitted in the aperture 5 and said sleeve is also provided with a plurality of axially extending holes to permit the passage of pressure fluid therethrough A helically wound spring 11 is interposed in compression between the face of the piston 3a and the wall between the larger cylinder and the outer chamber and another similar spring 12 is interposed between the valve 8 and the end of the housing. An air hole 13 is provided in the wall of the larger cylinder at its end adjacent the smaller cylinder The housing is connected from its smaller cylinder end by a flexible tube 14 to the top of the outer casing 15b of an oleo strut 15. The outer chamber end of the housing is connected by similar means 16, through a valve (not illustrated) under the control of the pilot, to a source of fluid pressure. A third flexible tube 17 leads from the wall of the larger cylinder, at a point adjacent the wall between said cylinder and the outer chamber, to the fluid-pressure operated brakes associated with the wheel 18 rotatably secured to an axle which in turn is fixed to the bottom 15a of the inner member of the oleo-strut.

The system is operated in the following manner. The pressure in the unloaded oleo strut is sufficient to move the smaller piston, thus operating the larger piston which overcomes the force of the springs and pushes the valve stem towards the outer chamber, hence maintaining said valve in the open position. On coming in to land the pilot operates the valve admitting fluid pressure into the brake system, whereupon fluid pressure from the source flows into the larger cylinder and thence into the brake system. The pressure in the system builds up until, acting on the larger piston, it overcomes the pressure in the oleo-strut acting on the smaller piston. Both pistons are then forced back and the spring-loaded valve is allowed to close, thus cutting off further fluid pressure supply from the source.

When the aircraft lands the movement of the oleo-strut further compresses the air within said strut. This additional pressure operates the smaller piston forcing the valve open against the spring and against the fluid pressure from the source and allowing further pressure fluid into the system. The pressure in the brake system will then build up until the pressure on the face of the larger piston is greater than the reacting pressure from the oleo-strut on the face of the smaller piston, when it will force the larger piston back, allow the valve to close and cut off the supply of fluid pressure from the source.

It will thus be seen that the amount of pressure allowed into the brake system varies directly with the amount the oleo-strut is deflected, i. e. with the proportion of the weight of the aircraft carried by the wheel.

When it is required to remove the braking pressure, e. g. at the end of the landing run, the pressure may be released from the brake system by the pilot connecting the outer chamber to exhaust, which he may do, for example, by operating the valve under his control. The pressure in the system will thereupon force the valve off its seating and allow the pressure to escape.

In another embodiment of the invention (Figure 2) the system comprises a housing 19 secured alongside the outer casing of a fluid-pressure operated oleo-strut 15, the longitudinal axis of the housing being parallel to that of the strut. The housing contains a cylinder 20 and an outer chamber 21 adjacent the cylinder and co-axial therewith and disposed adjacent the top of the strut. Integral with the housing and extending downwardly from the lower end thereof is a smaller cylinder 22 co-axial with the larger cylinder and having both ends open. Slidably fitted within the larger cylinder 20 is a piston 23. A central aperture 24 in the wall between the larger cylinder and outer chamber has a valve seat 25 extending into the outer chamber. A valve 26 is provided in the outer chamber adapted to operate over the valve seat and having a valve stem 27 extending axially into the larger cylinder. A helically wound spring 28 is inserted in compression between the valve and the end of the outer chamber, and a guide member 29 is provided in the cylinder to maintain the valve stem co-axial with the cylinder, holes being provided in said member to allow the passage of fluid therethrough.

A plunger 30 is slidably fitted in the smaller open cylinder and is connected by a plunger rod 31 with the bottom of the inner member 15a of the oleo-strut 15. A helically-coiled spring 32 is interposed between the piston 23 and the plunger 30. A flexible tube 33 leads from the outer chamber, through a valve (not illustrated) under the control of the pilot, to a source of fluid pressure. Another tube 34 leads from the larger cylinder to the fluid-pressure operated brakes associated with the wheel 18 mounted to the bottom of the oleo-strut. An air hole 35 is provided in the wall of the cylinder 22.

In operation, when the oleo-strut is unloaded the plunger is in such a position that the valve is held away from the valve seat. On coming in to land the pilot opens the valve controlling the supply of pressure fluid from the source, and pressure fluid flows into the system until the built-up pressure within the system forces the piston back by compressing the spring between the piston and the plunger, thereby allowing the spring-loaded valve to close and stopping any further pressure from entering the system. There will now be a certain amount of pressure within the system, sufficient to lightly operate the brake. On landing the movement of the inner member of the oleo-strut operates through the plunger rod, plunger and spring to overcome the pressure within the brake system, to force the piston back and to re-open the valve. As described in the previous embodiment, this will allow pressure fluid to flow into the system until the pressure within the brake system overcomes the pressure of the spring, when the valve will close and cut off the supply from the source.

It will be appreciated that in the first embodiment the device is controlled by the increase in pressure in the oleo-strut on landing, and in the second embodiment by the relative movement of the two slidable parts of the oleo-strut.

In yet another embodiment of the invention (Figure 3) the system consists of a housing 36 attached to the outer casing of an oleo-strut 15 and having its longitudinal axis parallel with the longitudinal axis of the strut. The housing is divided into three compartments, constituting a pressure chamber 37, an operating chamber 38 and an exhaust chamber 39. The wall 40 between the pressure and operating chambers is provided centrally with an aperture. Slidably fitted within the operating chamber is an annular piston 41 having a wall 42 extending axially from the inner periphery thereof. Said wall slidably fits within the aperture in the wall 40 and terminates in the upper chamber in a valve seat 43. Sealing rings 44 are provided between the axially-extending wall 42 and the transverse wall 40, and between the outer periphery of the piston 41 and the walls of the chamber 38. A coil spring 45 is fitted in the annular space between the axially-extending wall 42 and the sides of the operating chamber, and abuts at one end the transverse wall 40 and at the other end the reverse face of the piston 41.

The wall 45 between the operating and exhaust chambers is provided centrally with a hole through which is slidably fitted an exhaust tube 46, which also passes through a similar hole in the bottom of the chamber. The bottom end of the tube is closed, and is connected by links 47, 48, and 49 to the bottom of the inner member 15a of the oleo strut. Said exhaust tube is provided with a valve seat 50 at its upper end which projects into the operating chamber and with a port 51 communicating with the exhaust chamber. Sealing rings 52 are provided between the tube and the wall 45 and between the tube and the bottom of the exhaust chamber.

A valve stem 53 is slidably fitted through a sleeve 54 secured within the axially extending walls 42 of the piston 41, said sleeve being provided with holes to allow the passage of pressure fluid therethrough. The valve stem is provided at each end with a valve. The upper valve 55 is adapted to operate over the valve seat 43 in the pressure chamber and the lower valve 56 is adapted to operate over the valve seat 50 in the operating chamber. A spring 57 is interposed between the valve 55 and the end of the bushing.

A flexible tube 58 leads from the pressure chamber, through a valve (not illustrated) under the control of the pilot, to a source of fluid pressure. Another tube 59 leads from the operating chambetr to the fluid-pressure operated brakes associated with the wheel 18 mounted at the bottom of the oleo-strut. A third flexible tube 60 leads from the lower chamber to exhaust.

In operation this modification is similar to those previously described. The device is so arranged that when the oleo-strut is fully extended the upper valve is open and the bottom valve is shut. On coming in to land the pilot operates the valve under his control and admits pressure fluid into the system. The pressure in the system builds up until it reaches a predetermined value when it forces the piston against the spring until the valve seat associated with the piston contacts the upper valve, thus cutting off the supply of pressure from the source.

On landing the compression of the oleo-strut, acting through the linkage, forces the exhaust tube and the valve stem upwardly and lifts the upper valve from its seating. Additional pressure fluid can then flow into the system until the brakes are applied with a pressure which is commensurate with the amount of deflection of the strut, whereupon the built-up pressure in the system operates the piston once more and closes the upper valve.

The compression of the oleo-strut on landing will be far greater than its compression when the aircraft is at rest. There will thus be a pressure build-up in the system in excess of what is required for normal braking. Means for exhausting this excess pressure are obtained in the lower chamber. After the initial impact of landing, the oleo-strut returns to its normal loaded position. This movement, acting through the linkage retracts the exhaust tube and opens the lower valve. Excess pressure can therefore pass from the system into the exhaust chamber and thence flow to exhaust. As the pressure in the system drops the spring loaded piston moves downwardly taking with it the upper spring loaded valve, the valve stem and the lower valve, until said lower valve contacts its associated valve seat, when the pressure in the system will again be commensurate with the amount of deflection of the oleo-strut.

As in the previous modifications, the pressure in the brake system may be allowed to escape by connecting the supply pipe with exhaust. The greater pressure in the system will thereupon lift the upper valve against its spring, thereby lifting the lower valve from its seating, and the pressure will flow through the exhaust chamber to exhaust.

In yet a further embodiment of the invention (Figure 4) the system comprises a cylindrical housing 61 attached to the outer casing of an oleo-strut 15 and having its longitudinal axis parallel with the longitudinal axis of the strut. The housing is open at the bottom and closed at the top and is divided into two chambers, an upper chamber 62 and a lower chamber 63. The wall 64 between the two chambers is provided with a central aperture having a valve seat 65 extending into the upper chamber. A valve 66 is provided in the upper chamber having a stem 67 extending into the lower chamber. A sleeve 68 is provided in the aperture in the wall 64 to maintain the stem co-axial of the cylinder, and said sleeve is provided with a plurality of holes to permit the passage of pressure fluid therethrough. The upper chamber communicates by means of a pipe 69 and through a valve (not illustrated) under the control of the pilot, with a source of fluid pressure, and a helically coiled spring 70 is provided between the valve and the end of the upper chamber.

A piston 71 is slidably fitted in the lower chamber having a tube 72 extending downwardly from one face thereof. Said tube is closed at its bottom extremity and has a port 73 at a position approximately half-way along its length. Holes 74 are drilled through the piston so that pressure fluid may pass through the piston, down to tube and out of the port in the side of the tube. Upward movement of the piston is adapted to force the valve stem upwards, thereby opening the valve.

A hollow cylindrical member 75 is provided, the end walls thereof being provided centrally with holes, and said cylindrical member is slidably fitted over the tube 72. Sealing rings 76 fitted between the end walls of the cylindrical member and the tube ensure that fluid-tight joints are provided. A port 77 is provided in the wall of the cylindrical member and is connected by a rigid pipe 78 to the bottom of the inner member 15a of the oleo-strut 15. Another rigid pipe 79 connects the end of pipe 78 with the fluid-pressure operated brakes associated with the wheel 18. A coil spring 80 is fitted over the tube 72 between the piston and the top of the cylindrical member.

The cylindrical member is secured to the bottom of the oleo-strut in such a manner that it is maintained in a fixed position relative to said bottom part. Movement of the strut will thus cause the cylindrical member to move up and down the tube. It will be appreciated that the cylindrical member should be of such a length that the port in the tube will always be situated within said member, irrespective of the compression of the strut.

In operation this embodiment is similar to those previously described, the advantage in this case being that no flexible tubes are employed to convey the pressure fluid from the device to the brakes.

Having described my invention—what I claim is:

A braking system for an aircraft wheel brake wherein said wheel is mounted on an oleo-strut, comprising a housing secured alongside one part of the strut and containing a pressure chamber within said housing connected to a source of fluid pressure and an operating chamber aligned with said pressure chamber on a line parallel to the axis of the strut, a passage connecting said chambers, an inlet valve in the pressure chamber spring-urged to close said passage, a valve stem secured to said valve and extending axially into the operating chamber, a piston slidable in the operating chamber to contact the end of said valve stem, a tube extending axially from the piston away from the operating chamber, said tube communicating through the piston with the operating chamber and being closed at the opposite end, a hollow cylindrical member slidably fitted over said tube, a rigid pipe fixed to the other part of the strut and connecting the said member with the wheel brake, a port in the tube communicating with the interior of the hollow cylindrical member and a helical spring located between the piston and the adjacent end of said member to maintain the piston in contact with the valve stem.

HENRY WILLIAM TREVASKIS.

REFERENCES CITED

The following references are of record in the file of this patent:

UNITED STATES PATENTS

| Number | Name | Date |
| --- | --- | --- |
| 1,809,069 | Sanford | June 9, 1931 |
| 1,887,583 | Down | Nov. 15, 1932 |

FOREIGN PATENTS

| Number | Country | Date |
| --- | --- | --- |
| 848,395 | France | Oct. 27, 1939 |